United States Patent [19]
Matchett et al.

[11] Patent Number: 5,168,082
[45] Date of Patent: Dec. 1, 1992

[54] FUNCTIONALIZED COLLOIDAL SILICA SOL AS A CERAMICS ADDITIVE

[75] Inventors: Stephen A. Matchett, Grand Haven, Mich.; Kevin J. Moeggenborg, Aurora, Ill.

[73] Assignee: Nalco Chemical Company, Naperville, Ill.

[21] Appl. No.: 743,662

[22] Filed: Aug. 12, 1991

[51] Int. Cl.$^5$ ............... C04B 35/14; C04B 35/16; C04B 35/18; C04B 35/20

[52] U.S. Cl. .................. 501/133; 501/53; 501/73; 501/154; 106/287.1; 423/335; 252/302; 252/309; 252/313.2

[58] Field of Search ............ 501/53, 73, 133, 153, 501/154; 106/287.1, 287.17; 252/302, 304, 309, 313.2, 315.01; 423/324, 335, 342; 427/199, 204, 427

[56] References Cited

U.S. PATENT DOCUMENTS

| | | | |
|---|---|---|---|
| 2,843,507 | 7/1958 | Long | 117/129 |
| 3,013,897 | 12/1961 | Cupery et al. | 117/46 |
| 3,808,013 | 4/1974 | Manigault | 106/65 |
| 3,826,813 | 7/1974 | Gardner et al. | 423/328 |
| 3,835,054 | 9/1974 | Olewinski et al. | 252/62 |
| 4,110,117 | 8/1978 | Mcleod | 106/1.17 |
| 4,758,469 | 7/1988 | Lange | 478/325 |

FOREIGN PATENT DOCUMENTS 0738741 3/1970 Belgium ............... 501/133

OTHER PUBLICATIONS

Spray-Drying Ceramic Powders, (Stanley J. Lukasiewicz), Journal of the American Ceramic Society, vol. 72, No. 4 Apr., 1989, 617–624.

Surface Modification of Colloidal Silica (Badley, Ford, McEnroe, Assink) Langmuir, vol. 6, No. 4, 1990, 792–801.

Spray Drying: A Traditional Process for Advanced Applications (Fred V. Shaw) Ceramic Bulletin, vol. 69, No. 9, 1990, 1484–1489.

Dry Pressing (James S. Reed & Robert B. Runk) Treatise on Materials Science and Technology, vol. 9, Academic Press 1976, 71–93.

*Primary Examiner*—William R. Dixon, Jr.
*Assistant Examiner*—Michael Marcheschi
*Attorney, Agent, or Firm*—Robert A. Miller; Joseph B. Barrett

[57] ABSTRACT

The invention provides a ceramic composition including as an additive a functionalized colloidal silica sol. The ceramic composition of the invention having an increased green strength.

1 Claim, 1 Drawing Sheet 5,168,082

FUNCTIONALIZED COLLOIDAL SILICA SOL AS A CERAMICS ADDITIVE

BACKGROUND OF THE INVENTION

1. Field of the Invention

The invention is generally related to colloidal silica sols, and more particularly, to functionalized colloidal silica sols as a ceramics additive.

2. Description of the Prior Art

Through the hydrolysis of tetraalkyl ortho-silicates, spherical, monodisperse particles of colloidal silica can be prepared. The surface of these particles is modified to stabilize them in water or organic solvents. Surface modified collodal silica particles are referred to as functionalized, as are the resulting collodal solutions, or sols.

Surface modification of colloidal silica particles has been generally limited to binding polymer chains through surface esterification of surface silanols or through a urethane linkage. For example, aminopropyl, octadecyl, mercaptopropyl and polyethylene oxide groups have been bound to colloidal silica particles in order to stabilize the colloidal silica sols in water. In organic solvents, polystyryl anions, trimethoxysilyl-terminated polymers, and monohydroxy-terminated poly(-dimethylsiloxane) have been reacted with the silica surface to provide stable colloidal silica dispersions.

Ceramics used in high-tech applications are generally prepared from a fine powder which is shaped and fired to achieve a desired microstructure or properties. The most popular method for shaping high-tech ceramics is dry-pressing. Dry-pressing may be defined as the simultaneous uniaxial compaction and shaping of a fine granular ceramic powder with small amounts of water and/or organic binders during confined compression in a die. The popularity of dry-pressing is attributable to its inherent ability to rapidly form a wide variety of ceramic pieces having a variety of shapes, while maintaining close tolerances and controlled compact character.

Spray-drying is a process which produces fine ceramic powder used in dry-pressing. Aluminas, zirconias, titanates and ferrites are examples of ceramic powders produced by the spray-drying process. Generally, with regard to spray-drying, a slurry containing one of the above minerals is transformed into a dry powder by spraying the slurry into a hot drying gas. The majority of spray-dried ceramic powders are generated from water-based slurries. In more detail, the slurry is pumped through an atomizer located in the drying chamber. The slurry is broken down by the atomizer into a large number of uniform, spherical droplets. These droplets are spherical-shaped because of the effects of surface tension. Water is promptly evaporated from the droplets and the resulting dry powder is stored for future use in dry-pressing and firing operations. Properly done, spray-drying is an economical and continuous operation which produces a fine powder of uniform character.

Slurries used in spray-drying typically include dispersants and binders. Dispersants are organic polymers adsorbed onto the surface of the particles by Coulombic or van der Waals forces or hydrogen bonding. A wide variety of dispersants is available and the properties of the more common dispersant are well known in the ceramic art. Binders are added to powders to increase the green strength of the compacted, non-fired article. Selection of the binder system is based on cost, purity, ease of thermal removal, compaction behavior/green strength, and sensitivity to environmental conditions (i.e., ambient humidity). The binder can be a water-soluble type, such as poly(vinyl alcohol), or an emulsion of an organic substance dispersed in water. Probably the most common binder used in spray-drying ceramic powders is poly(vinyl alcohol). Dispersants and binders are eliminated from the green (non-fired) ceramic piece during a sintering (firing) step, wherein the additives are "burnt-out". Depending on the temperature and time required to burn these additives out, imperfection can occur in the finished ceramic piece.

SUMMARY OF THE INVENTION

Figure 1:
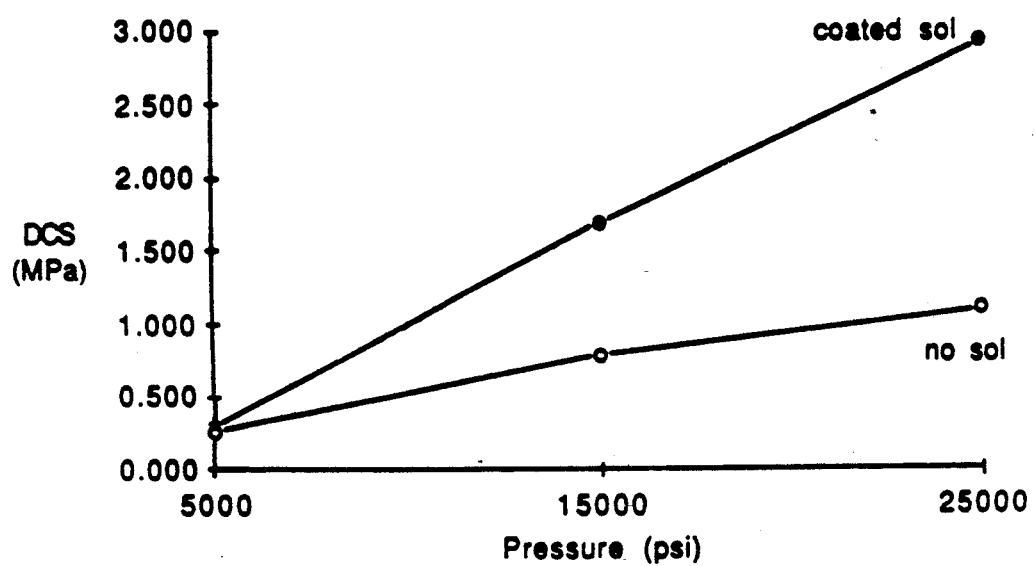
FIG. 1 graphically presents the increase in green strength of unfired ceramic pellets including the functionalized silica sol of the invention, versus unfired ceramic pellets which do not include the functionalized silica sol.

The present invention advantageously provides a compacted, non-fired ceramic composition which has increased green strength. Accordingly, one aspect of the present invention is directed to ceramic compositions comprising from about 1 percent to about 25 percent by weight of functionalized colloidal silica particles and from about 75 percent to about 99 percent by weight of at least one ceramic powder selected from the group consisting of aluminas, zirconias, titanates and ferrites.

The present invention also advantageously provides a manufacturing process which reduces or optimally omits organic ceramic binders and dispersants, thereby obviating the need to remove them during the sintering step. This not only reduces the risk of defect in the fired ceramic piece, but also reduces manufacturing cost. Therefore, another aspect of the invention is directed to a process for manufacturing a green ceramic composition, the process comprising the steps of: a) reacting a predetermined amount of an aqueous colloidal silica dispersion with an effective amount of a functionalized silane to produce an aqueous mixture including a plurality of silane coated colloidal silica particles; b) admixing a sufficient amount of the aqueous dispersion including the plurality of silane coated colloidal silica particles to an aqueous mixture of a ceramic powder to form an aqueous dispersion; c) spray-drying the aqueous dispersion to produce a dry product including the silane coated colloidal silica particles and the ceramic powder, and d) dry-pressing the dry product to form a green ceramic composition.

DESCRIPTION OF THE PREFERRED EMBODIMENTS

The present invention provides a compacted, non-fired green ceramic composition having a substantially increased green strength. It has been discovered that in spray-drying applications functionalized silica particles (sols) spray-dried with ceramic powders greatly increases the green strength of the compacted, non-fired ceramic piece, i.e., increasing the green strength of a piece without increasing the amount of binder or maintaining the green strength of a piece at a lower binder level. Therefore, the compositions of the present invention reduces or may possibly eliminate the need for an organic ceramic binder. This provides several advantages: 1) reducing the risk for damaged or inferior ceramic pieces; and 2) increasing the green strength at a given binder level.

In addition, the ceramic compositions of the present invention can be resuspended in an aqueous media after compaction and prior to the firing step. Therefore, the functionalized silica sol included in the compositions of the present invention is also acting as a dispersant. Thus, no additional organic dispersants need to be included in the inventive compositions. Accordingly, organic dispersants generally included in ceramic compositions are eliminated by the present invention. This provides the additional advantages of: 1) reducing the risk of imperfection in the fired ceramic piece; and 2) increasing the recyclability of the green product.

Not to limit the present invention, but it is believed that the functionalized silica sols of the inventive ceramic compositions increase the green strength of the compacted, non-fired compositions by forming an intermeshed lattice of the silane polymer chains with themselves or the organic binder through a polymer entanglement type mechanism.

According to one embodiment of the invention, the functionalizing group attached to the silica sol is a branched or straight chain silane including at one end a hydrophilic moiety and at another end a silicon anchor group. The functionalizing silane group is preferably attached to the colloidal silica particle surface through the silicon anchor group in the molecule. This allows the hydrophilic moiety to remain free, extending away from the surface of the silica sol. Preferred functionalizing groups include: 4-aminobutylsilane; N-2aminoethyl-3 aminopropylsilane; and N-(silylpropyl) ethylenediaminetriacetate. In one embodiment of the invention, the functionalizing group is aminopropylsilane. As described in the Examples below, ceramic compositions including an aminopropylsilane modified silica sol used in spray-dried applications had an increased green strength of pressed parts threefold over conventional spray-dried compositions. Furthermore, the non-fired powders and compressed ceramic parts are redispersable in an aqueous medium. Thus, these compositions are recyclable.

Preferably, the non-fired ceramic compositions of the invention include from about 1 to about 25 percent by weight functionalized colloidal silica particles and from about 75 percent to about 99 percent by weight of at least one ceramic powder selected from the group consisting of aluminas, zirconias, titanates and ferrites. More preferably, the non-fired ceramic compositions include from about 5 to about 15 percent by weight of the functionalized colloidal silica particles, and, most preferably, about 10 percent by weight.

The following Examples are presented to describe preferred embodiments and utilities of the invention and are not meant to limit the invention unless otherwise stated in the claims appended hereto.

EXAMPLE 1

A functionalized colloidal silica sol was prepared using the following procedure. 200 g of a colloidal silica sol, obtained from Nalco Chemical Company, Naperville, Ill, was brought to 90° C. and a dropwise addition of 79.08 g, of aminopropyltriethoxy silane, obtained from Union Carbide, was begun. The aminopropyltriethoxy silane addition was delivered at 90°–100° C. over the course of one and one-half hours. The reactor was heated an additional three hours at 95°–100° C. after the addition was complete. The pH of the reaction products was adjusted with concentrated hydrochloric acid at 50° C. to about pH 10. Excess water was removed from the product of the reaction by evaporation over twelve hours to increase the concentration of the solids and to induce gelation. After evaporation, concentrated hydrochloric acid was added to lower the pH to 8, and the temperature of the reactor was raised to 75° C. to cause gelation. It took several days for this material to form a gelled solid. The gel was dried to a hard glassy material at 100° C. under vacuum for two hours. When the dry material was placed in water, it redispersed to give a stable colloid. The material prepared as described above was used in Example 2. The dry material may also be stored for later use. For convenience, the functionalized sol may be stored prior to the gelation step for extended periods of time (months). It may then be used directly as a colloid for processing similar to that taught by Example 2

EXAMPLE 2

A green ceramic composition having an increased green strength was prepared using the following procedure. 375.36 g of $Al_2O_3$ (alumina), obtained from Alcoa, grade A152SG, and 37.12 g of the dry functionalized colloidal silica sol prepared in Example 1 were admixed in 137.50 ml of water. The reaction product was a highly fluid dispersion which was jar-milled for about twelve hours. This dispersion was spray-dried to form a dried ceramic powder which was placed in a 20% relative humidity chamber for forty-eight hours. The dry ceramic powder was collected and dry-pressed into disc-shaped pellets having a diameter of about 28.6 mm and a thickness of about 10 mm. The thickness varied with compaction pressure.

Eight pellets were pressed at increasing pressures: pellet A1–3 at 5000 psi; pellets A4 and A5 at 15000 psi; and pellets A6–8 at 25000 psi. The pellets were subsequently crushed to determine green strength. The green strength of the ceramic pellets including the functionalized silica sol was compared to ceramic pellets not including any colloidal silica, the latter being dispersed with Maraspers SBOS-4, obtained from Daishowa Chemicals Inc. The results of this comparison are summarized in FIG. 1. As shown in FIG. 1, the green strength of the pellets including the functionalized silica sol was increased by threefold. Changes can be made to the composition, operation and arrangement of the various ceramic compositions, steps and procedures described herein without departing from the concept and scope of the invention as defined in the following claims.

What is claimed is:

1. A non-fired, dry-pressed ceramic composition comprising from about 1 percent to about 25 percent by weight functionalized colloidal silica particles and from about 75 percent to about 99 percent by weight of at least one ceramic powder selected from the group consisting of aluminas, zirconias, titanates and ferrites.

* * * * *